F. P. GRODE.
ROUTING MACHINE.
APPLICATION FILED MAR. 26, 1908.

900,524.

Patented Oct. 6, 1908.

Witnesses:
John Enders
Chas. H. Buell

Inventor:
Frank P. Grode.
By Dyrenforth, Lee, Chritton & Wiles
Attys.

F. P. GRODE.
ROUTING MACHINE.
APPLICATION FILED MAR. 26, 1908.

900,524.

Patented Oct. 6, 1908.

F. P. GRODE.
ROUTING MACHINE.
APPLICATION FILED MAR. 26, 1908.

900,524.

Patented Oct. 6, 1908.
6 SHEETS—SHEET 5.

Witnesses:
John Enders
Chas. H. Buell

Inventor:
Frank P. Grode.
By Dyrenforth, Lee, Chritton & Wiles
Attys

UNITED STATES PATENT OFFICE.

FRANK P. GRODE, OF WABASH, INDIANA.

ROUTING-MACHINE.

No. 900,524.  Specification of Letters Patent.  Patented Oct. 6, 1908.

Application filed March 26, 1908. Serial No. 423,466.

*To all whom it may concern:*

Be it known that I, FRANK P. GRODE, a citizen of the United States, residing at Wabash, in the county of Wabash and State of Indiana, have invented new and useful Improvements in Routing-Machines, of which the following is a specification.

My invention relates, more particularly, to the class of routing-machines intended for use in forming grooves of irregular form in pieces of material, such as wood, and, more especially, grooves of the character illustrated and described in United States Letters Patent No. 636,816, granted to C. H. Lawton November 14, 1899, the principal characteristic of the groove illustrated in this patent being the irregularity of its bottom surface and undercut wall portions.

My object, generally stated, is to provide a machine of the character referred to which will be capable of performing the routing operation in a more effective manner than in the case of the class of machines as hitherto provided; and to this end, I have devised the combination of elements hereinafter described and claimed and illustrated in the drawings, in which—

The frame of the machine is composed of side-members 12 and 13 joined together by a bar 14 extending across the front end of the machine and bolted to the frame-sides, as indicated at 15, and an upper and lower cross-bar 16 and 17 respectively bolted to the frame-sides, as indicated at 18, to extend across the machine a slight distance in the rear of its transverse center. The bar 17 is provided on a lateral face with a dove-tailed tongue 19. The bar 16 carries two similarly located dove-tailed tongues 20 and 21 which extend in the same plane from opposite ends of the bar to points near the longitudinal center thereof, and formed integrally with the bar 16, midway between its ends, is a vertical web 22 carrying a head 23 having a flat horizontal top surface provided with a dove-tailed guide-groove 24 extending parallel with the frame-sides.

Figures 5, 6, 7, 8:
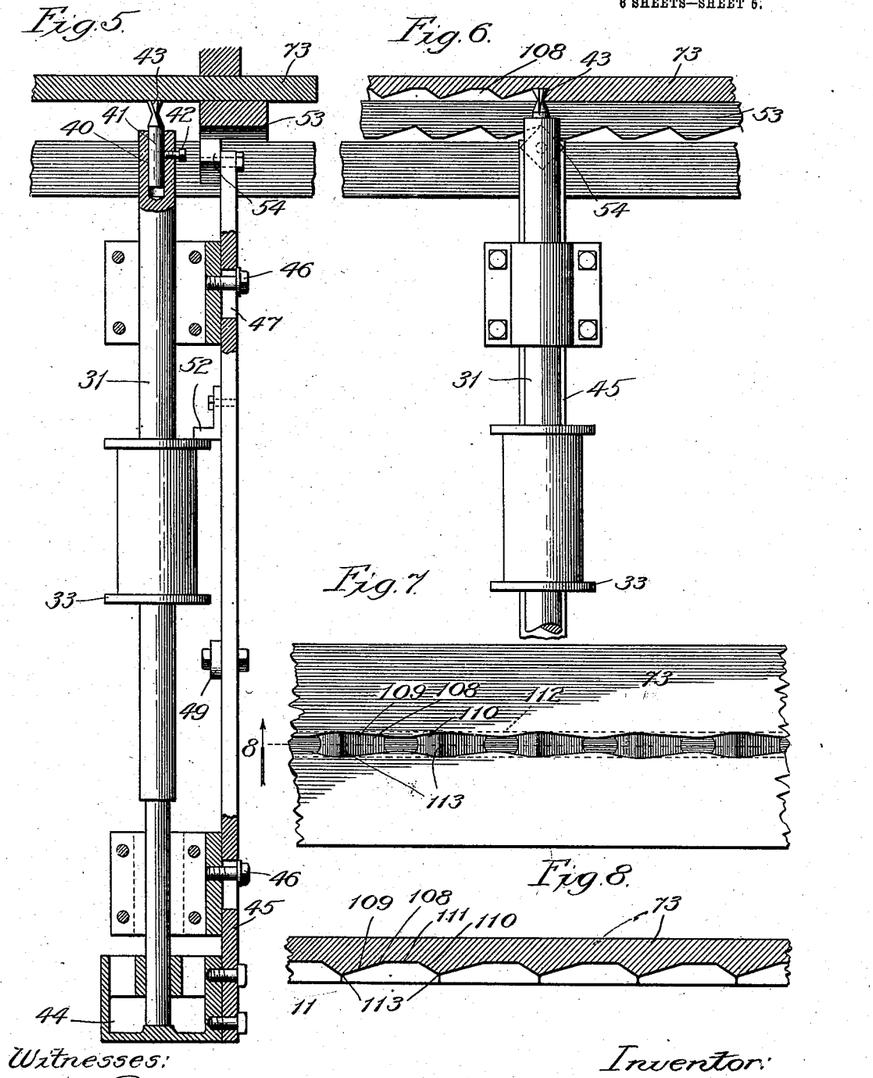
Fig. 5 is a broken section taken at the line 5 on Fig. 4 and viewed in the direction of the arrow, showing the cutter in the position it occupies before it is operated to cut a groove.
Fig. 6 is a view in elevation of the upper end of the cutter-arbor and cutter, showing the cutter-guide in side elevation and illustrating the operation of cutting a groove.
Fig. 7 is a bottom plan view of a portion of a piece of material to be operated upon showing the form of groove the machine of the preceding figures is caused to cut in the material during its operation.
Fig. 8 is a section taken at the line 8 on Fig. 7 and viewed in the direction of the arrow.

In the operation of the machine, the material to be operated on is caused to be moved into engagement with the rotary cutter or cutters, which latter, under the action of a guide or guides, is caused to be moved up and down to form the shape of groove desired, the construction of the cutting devices being as follows: Slidably mounted at opposite sides of the longitudinal center of the machine on the bars 16 and 17, to engage with the dove-tailed guide-tongues thereon, are yoke-frames 25 and 26, each comprising an upper and lower box 27 and 28, each pair of which is joined together by a vertically extending bar 29, the bars being provided with set-screws 30 for engagement with the guide-tongues on the bars 16 and 17 for the purpose of securing the yokes adjustably as hereinafter described, in adjusted positions on the cross-bars. Journaled in the upper and lower boxes in vertical position are two arbors 31 and 32 carrying pulleys 33 and 34 connected by means of belts 35 and 36 with pulleys 37 and 38, respectively, on a drive-shaft 39, each arbor having a socket 40 in its upper end in which a cutting-tool 41 is releasably secured as by a set-screw 42. The cutting-tool, which is most clearly illustrated in Figs. 5 and 6, is of the general double frusto-conical shape represented, with opposed cutting edges 43, one only of which is shown, the upper frusto-conical portion of the cutter being the only portion thereof which performs the cutting operation hereinafter described. The lower ends of the arbors 31 and 32 rest in stop-bearings 44 carried on the lower ends of two vertical bars 45 having sliding connection with the upper and lower boxes 27 and 28 through the medium of screws 46, fastened in the boxes and projecting through longitudinally extending slots 47 in the bars 45. The bars 45 are pivoted between their ends, as represented at 48, to the outer ends of levers 49, the latter being fulcrumed as indicated at 50, 50, each lever carrying a weight 51 at its inner end for normally yieldingly holding the bars 45 and arbors 31 and 32 connected therewith in raised position. Each bar 45 carries a stop-lug 52 which bears against the upper end of the adjacent arbor-pulley and thus, in conjunction with the bearing 44, serves to insure the reciprocation of the arbors when the bars 45 are operated, as hereinafter explained.

The rise and fall of the arbors and consequently the cutting-tools, for cutting the grooves, is governed by means of guides 53 movable with the work and against which guide-engaging members 54 carried on the upper end-portions of the bars 45, impinge. The guide-members 54 are preferably of angular form, as represented, affording an apex 55 at which the member engages the guide 53.

The traveling carriage 56 for supporting the work and guide 53 is in the form of a flat bed resting flatwise at its ends upon the flat upper frame-surface of the frame-sides 12 and 13, and provided intermediate its ends with a dove-tailed tongue 57 on its under side sliding in the correspondingly shaped guide 24, and at its opposite ends with depending brackets 58, which are threaded to receive screw-shafts 59 and 60 extending parallel with the frame-sides through the medium of which screw-shafts the power is applied to the machine for moving the carriage back and forth in its guides as hereinafter explained. The central portion of the carriage is cut away with the exception of a thin rib 60$^a$ to afford the openings 61 and 62 above the cutters, the guide-bars 53 spanning these openings and extending longitudinally of the machine, these bars being adjustably secured to the carriage as by bolts 63 which pass through the bars 53 and into transverse parallel grooves 64 in the carriage. The guide surface on the under side of the bars 53 is made up of a series of long and short intersecting inclined surfaces 65 and 66, respectively, which extend along a portion of the bars as illustrated, and with which the apexes 55 of the members 54 engage under the action of the weights 51 as hereinafter explained.

Fulcrumed between their ends on upwardly extending lugs 67 provided on the carriage 56, are two levers 68, each of which carries a weight 69 adjustable on one end thereof, and a work-clamping block 70 between its ends, the other ends of the levers being deflected downwardly, as shown, for engagement with retainer-arms 71 working on threaded studs 72 supported on the bars 53, for releasably holding the blocks 70 in clamping engagement with the work to be operated on, such as the board represented at 73, to present a face of the latter to the cutters for cutting grooves therein.

In the operation of the machine illustrated, the carriage 56 is caused to travel from the starting position at the front end of the machine to the rear end, during which travel the work 73 is caused to be presented to the cutters 41 for cutting the grooves. After the grooves have been cut, the carriage 56 is automatically arrested and caused to be automatically returned to normal position, the mechanism for accomplishing these operations being as follows: Journaled across the front end of the machine is a shaft 74 carrying bevel pinions 75 and 76 which mesh with pinions 77 and 78 on the screws 59 and 60, respectively. The shaft 74 also carries two loose pulleys 79 and 80 belted by direct and crossed belts 81 and 82, respectively, to the drive-shaft 39, the pulleys 79 and 80 being separated by a clutch-device formed of two friction disks 83 and 84 adapted to be shifted in opposite directions for engaging with either of the pulleys 79 or 80 in a well-known manner. The means shown for shifting the clutches comprises a horizontally disposed bell-crank lever 85, engaging at its bifurcated end 86 with the clutch-device and fulcrumed at its angle, as indicated at 87, to a bracket 88 extending from the frame-side 13 and carrying a stud 89 at the end of its long arm which passes through a slot in the upper end of a vertical rock-arm 90 fulcrumed between its ends, as represented at 91, on a lug 92 projecting from the frame-side 13 and rigidly connected with a horizontal lever 93 intermediate the treadle portion 94 and weighted end 95 thereof. A slide-bar 96 is supported near one end against the face of a bearing 97 for the screw 60 by a set-screw 98 extending through a slot 99 in the bar and fastened in the bearing 97, and at its opposite reduced end passes through a longitudinal opening in the other bearing 100 for the screw 60, the bar 96 being pivotally connected, as indicated at 101, with the upper end of the lever 90, and carrying spaced tappets 102 and 103 adjustable with relation to each other on the bar 96, and adapted to be alternately engaged by a lug 104 on the adjacent bracket 58 in the reciprocatory movements of the carriage, as hereinafter described.

The operation of the machine is as follows: The normal position of the clutch-operating bar 90 is that in which the clutch-members 83 and 84 are out of engagement with the pulleys 79 and 80 and the sliding bar 96 is at the limit of its movement toward the front end of the machine.

Figure 1:
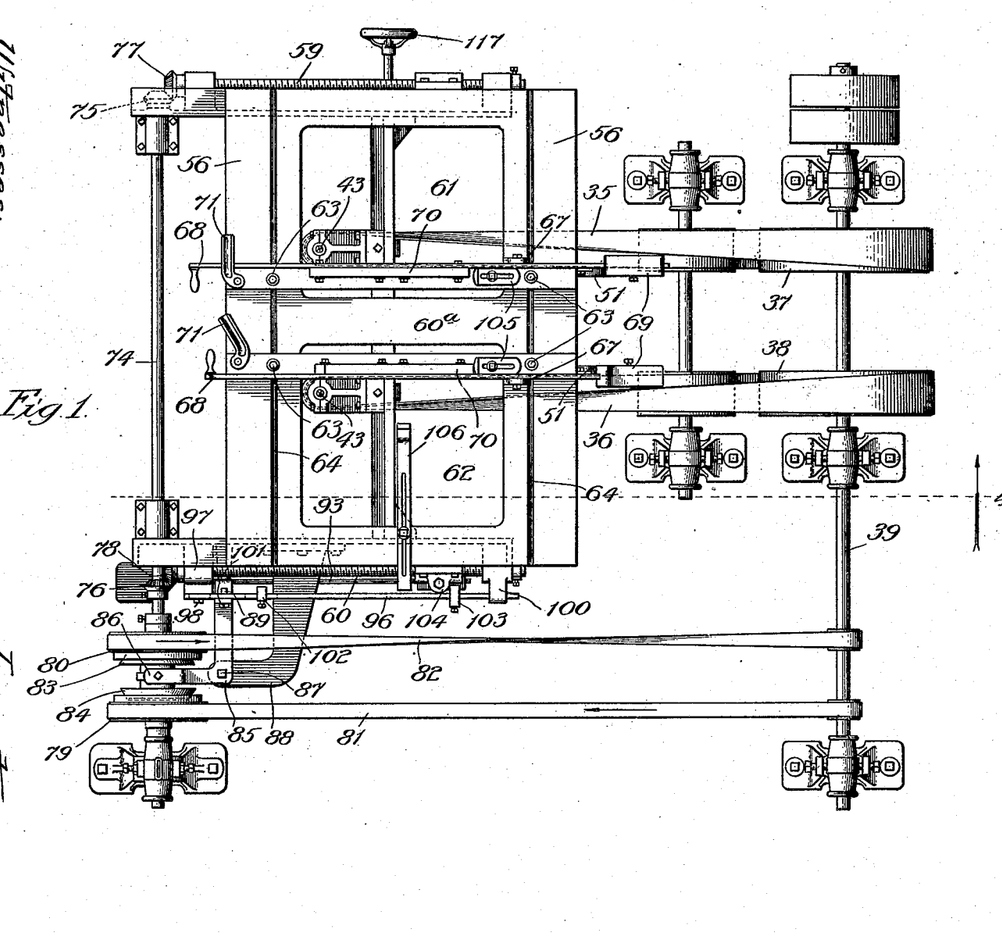
Figure 1 is a plan view of a machine embodying my improvements.
Figure 2:
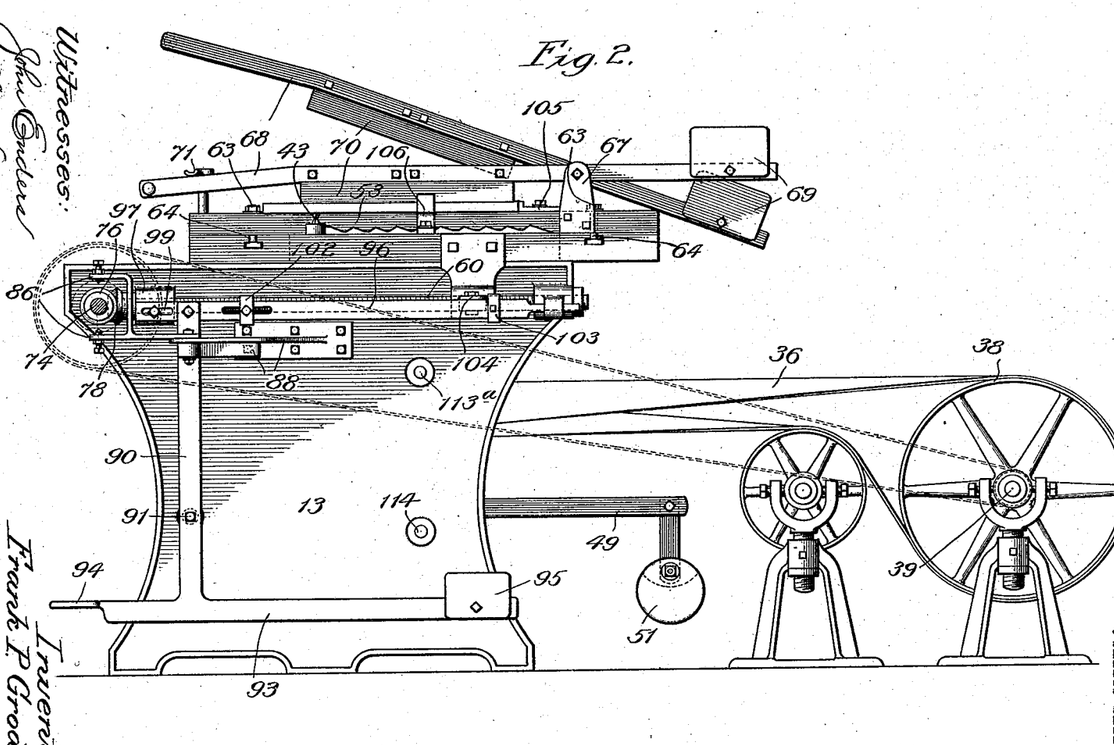
Fig. 2 is a side view of the machine illustrated in Fig. 1.
Figure 3:
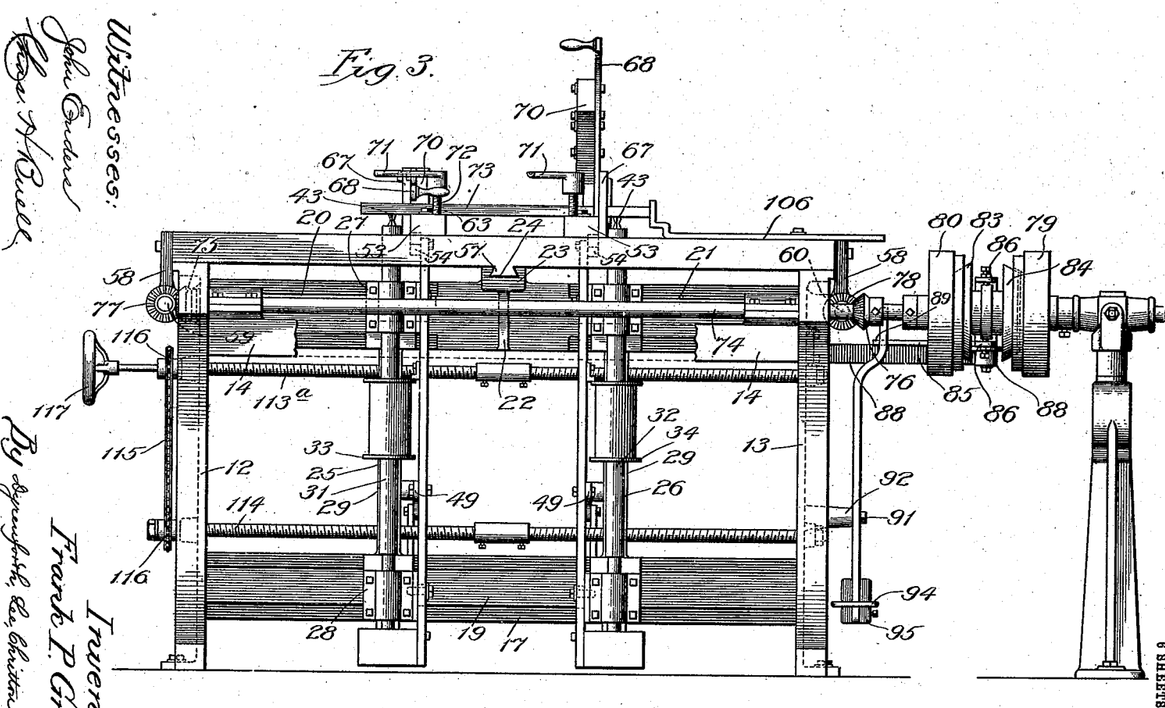
Fig. 3 is a view in elevation of the front end of the machine.
Figure 4:
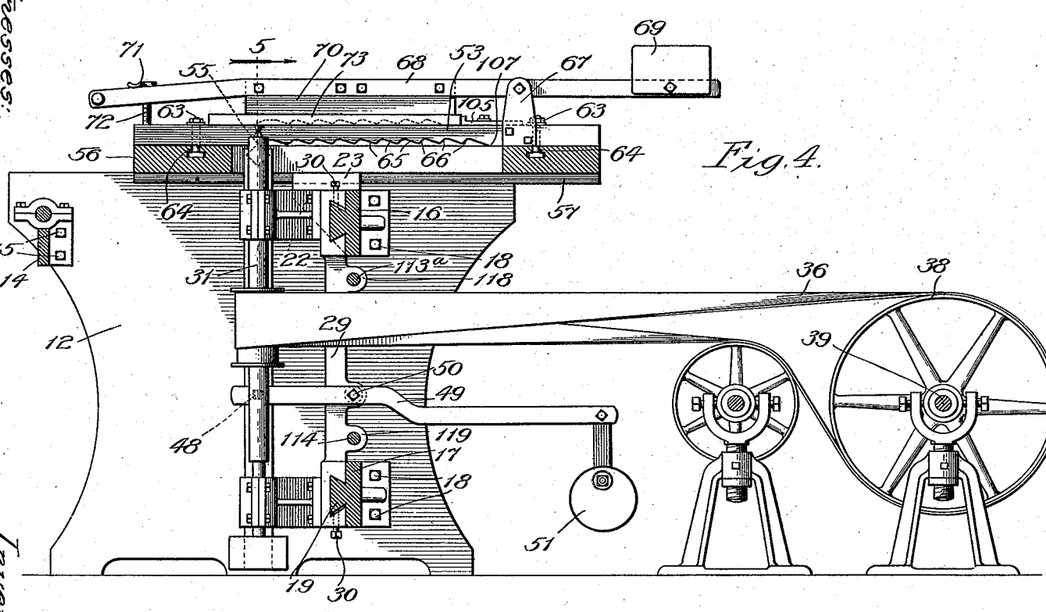
Fig. 4 is a section taken at the line 4 on Fig. 1 and viewed in the direction of the arrow.

The work to be operated on, as for instance that represented at 73, assuming it to be a flat board, in a face of which it is desired to form two parallel grooves, is placed on the top of the bars 53 to span the space between them and project beyond them as represented in Fig. 3, and positioned against adjustable stops 105 on the bars 53 and an adjustable stop 106 on the carriage 56, as represented in the drawings, to cause the cutters, operated as hereinafter described, to cut the grooves in the desired positions in the board. The levers 68, which normally incline with relation to the carriage 56 with their clamping-blocks 70 in raised position, as illustrated in Fig. 2 of one of the levers, are then turned on their fulcrums to cause the clamping-blocks 70 to bear against the upper surface of the work 73, in which position they are releasably held by turning the retaining-arms 71 into engagement with the inclined surfaces of the lever-ends, as illustrated.

When the carriage 56 is at the starting position the angle-members 54 rest against the flat under side surface 107 of the bars 53 beyond the inclines 55 and 56, the position of the carriage being the reverse of that illustrated in Fig. 2, and thus the cutting-tool extends flush with the top surface of the bars 53 and the under side of the work 73. With the work 73 and carriage 56 in the positions as described, assuming the arbors 31 and 32 and pulleys 33 and 34 to be operating through their belt-connections with the drive-shaft 39, as described, to operate the machine, the treadle 94 is depressed, thereby swinging the upper end of the arm 90 forwardly and turning the bell-crank 85, by reason of the connection of its lug 89 with the arm, to move the member 84 into clutch engagement with the pulley 79, whereupon the rotation of the shaft 74, through its gear connection with the screws 59 and 60, causes the latter to rotate. Rotation of these screws by reason of their threaded engagement with the brackets 58 on the carriage 56, causes the latter to move toward the rear of the machine. The operator continues to bear down on the treadle 94 until he feels it rise at its forward end. The treadle is thus caused to be operated while the foot of the operator is on it, through the connection of the treadle with the bar 96, this operation resulting when this bar is moved rearwardly by the engagement of the tappet 103 thereon with the lug 104 moving with the carriage, this occurring when the latter reaches the limit of its rearward stroke. In the rearward movement of the carriage, the inclined surfaces 65 and 66 of the bars 53 moving against the members 54 causes the apexes 55 of the latter, under the action of the weights 51, to ride upon these inclined surfaces, thereby communicating to the arbors 31 and 32 and their cutters 41, through the medium of the bars 45, up and down motion corresponding to the inclines 55 and 56. By reason of the form of the cutters 41 as described, the up and down motion given to them causes the formation of the parallel grooves 108 in the board 73, each groove formed with a long and short incline 109 and 110, respectively, and a flat surface 111 intermediate each pair of inclines, with undercut portions 112 between the crests 113 formed by the intersecting long and short inclines, as clearly shown in Figs. 7 and 8.

As hereinbefore stated, the rearward movement of the carriage 56 is continued until the lug 104 strikes the tappet 103 and moves the bar 96 to the position illustrated in Fig. 2, the movement of the bar, as described, by reason of its pivotal connection with the bar 90, causing the bell-crank 85 to be turned in opposite direction, thereby withdrawing the member 84 from engagement with the pulley 79 and clutching the member 83 to the pulley 80, with the result of reversing the movement of the shaft 74 and thereby causing the carriage 56 to move toward the front end of the machine and continue its movement until the lug 104 engages the tappet 102 and moves the bar 96 and bell-crank 85 against the action of the weight 95, to a position in which both clutch-members 83 and 84 are out of engagement with the pulleys 79 and 80, whereupon the machine automatically stops. The cutters 41 on their return movement follow the grooves made by them in the board 73 during its forward movement, and thus serve to clear the grooves so formed. The operation of forming the grooves 108 having been completed, the work 73 may be removed by turning the arms 71 out of engagement with the levers 68, whereupon new work may be applied to the machine and the described operations repeated.

For the purpose of adjusting the arbors 31 and 32 to separate them or draw them closer together for increasing or diminishing the distance between the grooves to be formed in the material to be operated upon, I provide two screw-shafts 113$^a$ and 114 which are journaled at their opposite ends in the frame-sides 12 and 13 to extend transversely of the machine, and are connected at their ends by a chain 115 running over sprockets 116 on the screw-shafts with a hand-wheel 117 on the shaft 113$^a$ for simultaneously turning both of the shafts. Each shaft 113$^a$, 114 is provided with a right and a left-handed thread as represented, the shaft 113$^a$ passing at its oppositely threaded portion through threaded openings in lugs 118 carried by the yoke-bars 29, and the shaft 114 being similarly connected with the bars 29 at lower lugs 119 thereon, whereby turning of the shafts 113$^a$, 114 causes the bars 29 to be simultaneously moved upon the cross-beams 16 and 17 to move the arbors 31 and 32 closer together or separate them farther apart, for effecting the desired positioning of the grooves in the work to be operated on. The adjustment of the arbors as described necessitates a corresponding adjustment of the bars 53 for positioning the guides thereon relative to the guide-engaging members 54, this being accomplished by reason of the provision of the slotted construction of carriage 56 which enables the bars 53 to be moved transversely thereon and clamped in adjusted position through the medium of the bolts 63.

Figure 9:
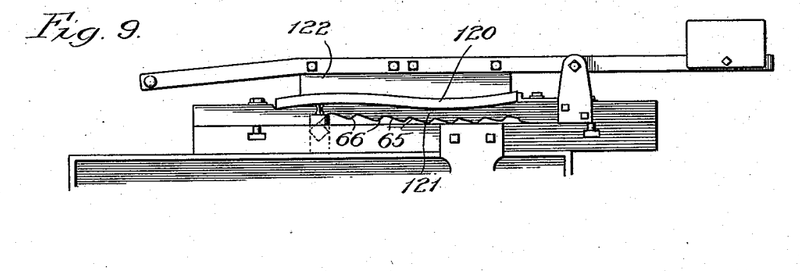
Fig. 9 is a view in side elevation of the upper end of the machine, showing it as adapted to form a groove in a curved piece of material.

When it is desired to form grooves in a piece of curved material, such as that represented at 120 in Fig. 9, the same being an unfinished part of a school-desk, guide-bars 121, each with a general contour corresponding to the curved face of the piece of work, with the long and short inclines 65 and 66, and clamping blocks 122 with work-engaging surfaces likewise curved to correspond with the face of the work 120, are substituted for the corresponding parts hereinbefore described.

Figures 10, 11:
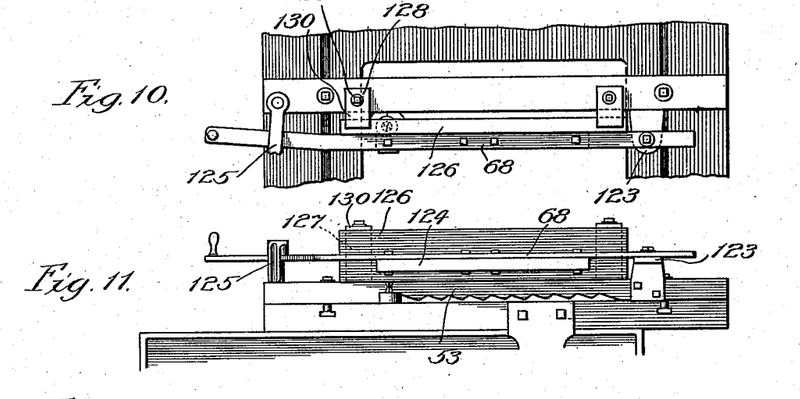
Fig. 10 is a plan view of a modified form of work-clamp.
Fig. 11 is a view of the same in side elevation.

While the machine illustrated is shown as operating on a single piece of material 73 or 120 supported to extend into position for engagement by the cutters 41, it is to be understood that the machine is not limited in its operation to operating on a single piece of wood for cutting parallel grooves therein, but it may be used to simultaneously operate on separate pieces of board secured in the clamping devices. Furthermore, the machine is adapted to cut grooves in the edges of material presented to the cutters 41 in upright position. The work-clamping means for this last-referred to purpose are slightly different from those heretofore described, owing to the fact that in the described construction the material lies flat which permits a presser-block to be applied to its upper face, whereas in the case of the clamping of a strip for operation on its edge, the clamping must be against lateral faces thereof. To clamp boards on the machine in position to present an edge of each to the cutters 41, I provide the lugs 67 with horizontal lips 123 to which I pivot the levers 68 to cause them to be operated in a horizontal plane. Each lever 68 carries a clamping-block 124 which, when the levers are turned to the clamping position illustrated in Figs. 10 and 11, in which they are held by the engagement of the angle-shaped retainers 125 with the deflected ends of the levers, engage with the separate pieces of work, one of which is represented at 126, and clamp them against the recessed faces 127 of retainer-blocks 128 bolted as indicated at 129 to the upper sides of the bars 53, the retainer-blocks 128 carrying horizontal projections 130 for engaging with the upper edges of the pieces of work 126 to hold the latter against displacement under the action of the cutters 41 when operating on the work as hereinbefore described.

The machine is thus caused to cut the groove or grooves by a cutter or cutters operating against the face or the edges of the work from below the latter, which is of great advantage, as the chips or cores produced by the cutting operation, as the work advances across the cutters, are caused to drop from the groove or grooves while being formed, thereby effecting the thorough clearing of the groove or grooves of all chips, and preventing the latter from interfering with the work of the cutters.

The angular form of guide-engaging member 54 serves in its engagement with the moving guide 53 to positively follow the inclines 65 and 66 on the guide and thus produce the up and down movements of the cutter necessary to form a groove of a predetermined shape. It is, however, to be understood that I do not intend to limit the use of certain combination of elements forming my invention to their use in a machine in which the only form of groove adapted to be cut is that illustrated.

What I claim as new, and desire to secure by Letters Patent, is—

1. In a routing-machine, the combination of a traveling work-support, a form-plate supported in a manner to cause it to move with the support, a rotating cutter-head of inverted frusto-conical form, and a reciprocable support for the cutter-head bearing normally against the form-plate, the whole being constructed and arranged to move the work and form-plate across the end of said cutter-head support while the work is engaged by the rotary cutter, and to cause the form-plate to reciprocate the cutter-head, thereby to produce a routing-groove having a series of undercut opposed walls and a bottom portion formed of a series of oppositely tapering surfaces.

2. In a routing-machine, the combination of a traveling work-support, a form-plate supported in a manner to cause it to move with the support and affording a guide-surface composed of a series of opposed inclines, a rotating cutter-head of inverted frusto-conical form, and a reciprocable support for the cutter-head bearing normally against the form-plate, the whole being constructed and arranged to move the work and form-plate across the end of said cutter-head support while the work is engaged by the rotary cutter, and to cause the form-plate to reciprocate the cutter-head, thereby to produce a routing-groove having a series of undercut opposed walls and a bottom portion formed of a series of oppositely tapering surfaces.

3. In a routing-machine, the combination of a traveling work-support, a form-plate supported in a manner to cause it to move with the support, a rotating cutter-head of inverted frusto-conical form, a reciprocable support for the cutter-head bearing normally against the form-plate and adapted to present the cutter-head carried by it to the under side of the work, and means for yieldingly maintaining the cutter-head in raised position, the whole being constructed and arranged to move the work and form-plate across the end of said cutter-head support while the work is engaged by the rotary cutter, and to cause the form-plate to reciprocate the cutter-head, thereby to produce a routing-groove having a series of undercut opposed walls and a bottom portion formed of a series of oppositely tapering surfaces.

4. In a routing-machine, the combination of a traveling work-support, a form-plate supported in a manner to cause it to move with the support and present its guide-surface on its under side, a rotating cutter-head of inverted frusto-conical form, a reciprocable support for the cutter-head bearing normally against the under side of said form-plate, and means for yieldingly maintaining the cutter-head in raised position, the whole being constructed and arranged to move the work and form-plate across the end of said cutter-head support while the work is engaged by the rotary cutter, and to cause the form-plate to reciprocate the cutter-head, thereby to produce a routing-groove having a series of undercut opposed walls and a bottom portion formed of a series of oppositely tapering surfaces.

5. In a routing-machine, the combination of a traveling work-support, a form-plate supported in a manner to cause it to move with the support, a rotating cutter-head of frusto-conical form, a shaft carrying the cutter-head journaled in bearings in the machine, and a reciprocable upright bar supporting the shaft and bearing at its upper end against the form-plate, the whole being constructed and arranged to move the work across the end of said cutter-head and the form-plate across the end of said bar while the work is engaged by the cutter and to cause the form-plate to reciprocate the cutter-head, thereby to produce a routing-groove having a series of undercut opposed walls and a bottom portion formed of a series of oppositely tapering surfaces.

6. In a routing-machine, the combination of a traveling work-support, a form-plate supported in a manner to cause it to move with the support, a rotating cutter-head of inverted frusto-conical form, a shaft carrying the cutter-head journaled in bearings in the machine, and a reciprocable upright bar provided with stop-bearings intermediate its ends engaging with the shaft and bearing at its upper end against the form-plate, the whole being constructed and arranged to move the work across the end of said cutter-head and the form-plate across the end of said bar while the work is engaged by the cutter and to cause the form-plate to reciprocate the cutter-head, thereby to produce a routing-groove having a series of undercut opposed walls and a bottom-portion formed of a series of oppositely tapering surfaces.

7. In a routing-machine, the combination of a traveling work-support, a form-plate supported in a manner to cause it to move with the support and present its guide-surface on its under side, a rotating cutter-head of inverted frusto-conical form, a shaft carrying the cutter-head journaled in bearings in the machine, a reciprocable upright bar supporting the shaft and having at its upper end a form-plate-engaging portion of angular shape at which it engages with the form-plate, and means for yieldingly maintaining the bar and cutter-head in raised position, the whole being constructed and arranged to move the work across the end of said cutter-head and the form-plate across the end of said bar while the work is engaged by the cutter and to cause the form-plate to reciprocate the cutter-head, thereby to produce a routing-groove having a series of undercut opposed walls and a bottom-portion formed of a series of oppositely tapering surfaces.

8. In a routing-machine, the combination of a traveling work-support, a form-plate adjustably supported on the machine in a manner to cause it to move with the support, a rotating cutter-head of inverted frusto-conical form, and a reciprocable support for the cutter-head adjustably mounted on the machine and bearing normally against the form-plate, the whole being constructed and arranged to move the work and form-plate across the end of said cutter-head support while the work is engaged by the rotary cutter, and to cause the form-plate to reciprocate the cutter-head, thereby to produce a routing-groove having a series of undercut opposed walls and a bottom portion formed of a series of oppositely tapering surfaces.

FRANK P. GRODE.

Witnesses:
MAUDE MILLER,
N. G. HUNTER.